United States Patent
Nishimura (10) Patent No.: US 8,150,599 B2
(45) Date of Patent: Apr. 3, 2012

(54) CONTROL APPARATUS AND CONTROL METHOD FOR INTERNAL COMBUSTION ENGINE

(75) Inventor: Taichi Nishimura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 287 days.

(21) Appl. No.: 12/525,090

(22) PCT Filed: Mar. 14, 2008

(86) PCT No.: PCT/JP2008/055194
§ 371 (c)(1),
(2), (4) Date: Jul. 30, 2009

(87) PCT Pub. No.: WO2008/111689
PCT Pub. Date: Sep. 18, 2008

(65) Prior Publication Data
US 2010/0145596 A1    Jun. 10, 2010

(30) Foreign Application Priority Data

Mar. 15, 2007  (JP) .................................. 2007-067202

(51) Int. Cl.
*F02D 41/30*  (2006.01)
*G01F 19/00*  (2006.01)

(52) U.S. Cl. ........................ 701/104; 123/431; 123/575

(58) Field of Classification Search .......... 701/103–105; 123/1 A, 3, 27 GE, 431, 494, 456, 575; 73/114.38, 73/114.52–114.54
See application file for complete search history.

(56) References Cited

U.S. PATENT DOCUMENTS

| | | | | |
|---|---|---|---|---|
| 4,594,968 A * | 6/1986 | Degobert et al. | ............. | 123/1 A |
| 5,950,591 A * | 9/1999 | Kageyama et al. | ........ | 123/196 S |
| 6,148,809 A * | 11/2000 | Cinquegrani | ................. | 123/683 |
| 6,620,392 B2 * | 9/2003 | Okamoto et al. | .......... | 423/213.5 |
| 7,322,344 B2 * | 1/2008 | Yonezawa | ...................... | 123/520 |
| 7,546,835 B1 * | 6/2009 | Hilditch | ........................ | 123/575 |
| 7,676,316 B2 * | 3/2010 | Lunati et al. | .................. | 701/103 |
| 7,845,343 B2 * | 12/2010 | Imai | .............................. | 123/674 |
| 2002/0162457 A1 * | 11/2002 | Hyodo et al. | .................... | 96/109 |
| 2009/0235888 A1 * | 9/2009 | Comtat et al. | ................. | 123/1 A |
| 2009/0314267 A1 * | 12/2009 | Kawai et al. | ................... | 123/674 |
| 2011/0132320 A1 * | 6/2011 | Ulrey et al. | ................... | 123/299 |

FOREIGN PATENT DOCUMENTS

| | | |
|---|---|---|
| JP | 61 197744 | 9/1986 |
| JP | 5 33748 | 2/1993 |
| JP | 2004 116420 | 4/2004 |
| JP | 2005 76543 | 3/2005 |
| JP | 2005 139922 | 6/2005 |
| JP | 2006 214415 | 8/2006 |
| JP | 2006 316667 | 11/2006 |
| JP | 2007 9903 | 1/2007 |

* cited by examiner

*Primary Examiner* — Willis Wolfe, Jr.
*Assistant Examiner* — Johnny Hoang
(74) *Attorney, Agent, or Firm* — Oblon, Spivak, McClelland, Maier & Neustadt, L.L.P.

(57) ABSTRACT

An engine ECU executes a program including detecting, when refueling with an alcohol fuel is performed, a refueling amount of the alcohol fuel based on a signal transmitted from a sender gauge, increasing DI ratio r that is a ratio between a fuel injection amount from an in-cylinder injector and a fuel injection amount from an intake passage injector, according to the refueling amount of the alcohol fuel, such that the ratio of the fuel injection amount from the in-cylinder injector is higher, and retarding the ignition timing according to the refueling amount of the alcohol fuel.

9 Claims, 4 Drawing Sheets

CONTROL APPARATUS AND CONTROL METHOD FOR INTERNAL COMBUSTION ENGINE

TECHNICAL FIELD

The present invention relates to a control apparatus and a control method for an internal combustion engine, and particularly to a technique for controlling the ignition timing and controlling the amount of fuel to be injected into a cylinder, according to information about the amount of fuel in a fuel tank.

BACKGROUND ART

An FFV (Flexible Fuel Vehicle) using a fuel made of a blend of gasoline and alcohol (ethanol) or a fuel made of alcohol only (these fuels are hereinafter also referred to as alcohol fuel) has been known. The alcohol fuel is different in characteristics from gasoline. For example, the alcohol fuel has a higher octane number than gasoline, and is therefore less likely to cause knocking. Accordingly, in the case where the alcohol fuel is used, it is preferable to control the ignition timing of the internal combustion engine in a manner different from the case where only the gasoline is used as fuel. For example, in order to improve the output of the internal combustion engine, the ignition timing may be advanced for a higher alcohol concentration relative to the ignition timing for a lower alcohol concentration.

Japanese Patent Laying-Open No. 5-33748 discloses an engine ignition timing control apparatus for an engine using an alcohol fuel, with which the output and fuel economy can be improved without causing knocking. The ignition timing control apparatus disclosed in Japanese Patent Laying-Open No. 5-33748 includes an engine speed detection unit for detecting the engine speed, an ignition timing control unit for controlling the ignition timing of the engine based on an output of the engine speed detection unit, an alcohol concentration detection unit for detecting the alcohol concentration of a fuel in use, and an ignition timing correction unit for correcting, based on respective outputs of the engine speed detection unit and the alcohol concentration detection unit, the ignition timing set by the ignition timing control unit by advancing the set ignition timing when the engine speed is low and the alcohol concentration is high.

The ignition timing control apparatus disclosed in the above-referenced publication corrects the ignition timing by advancing the ignition timing when the engine speed is low and the alcohol concentration in the fuel in use is high, relative to the ignition timing when the alcohol concentration is low. The ignition timing is thus appropriately controlled when the engine speed is low. The output and fuel economy can accordingly be improved without causing knocking.

As for refueling, the fuel supplied for refueling does not always have the same alcohol concentration. For example, an alcohol fuel of a lower alcohol concentration than that of the alcohol fuel remaining in the fuel tank could be supplied for refueling. In such a case, the octane number suddenly decreases. While Japanese Patent Laying-Open No. 5-33748 discloses that the ignition timing is set according to the detected alcohol concentration, it takes some time to detect the alcohol concentration. Therefore, if an alcohol fuel of a lower alcohol concentration is supplied for refueling, the ignition timing could be advanced until the detection of the alcohol concentration is completed and until knocking occurs.

DISCLOSURE OF THE INVENTION

An object of the present invention is to provide a control apparatus and a control method for an internal combustion engine with which the frequency of occurrence of knocking can be reduced.

A control apparatus for an internal combustion engine according to an aspect of the present invention includes a sender gauge for detecting information concerning refueling of a fuel tank, and an operation unit. The operation unit controls ignition timing according to the information concerning refueling of the fuel tank.

With the above-described configuration, the ignition timing is controlled according to the information about refueling of the fuel tank. For example, the ignition timing is retarded as the refueling amount, namely the amount of fuel supplied for refueling, is larger. In this way, even if the octane number is suddenly decreased when refueling with the alcohol fuel is done, knocking can be made less likely to occur. Accordingly, the frequency of occurrence of knocking can be reduced.

Preferably, the information concerning refueling is a refueling amount. The operation unit controls the ignition timing according to the refueling amount.

With the above-described configuration, the ignition timing is controlled according to the refueling amount. Thus, the ignition timing can be controlled according to a change of the octane number of the alcohol fuel.

More preferably, the operation unit controls the ignition timing such that the ignition timing is further retarded as the refueling amount is larger.

With the above-described configuration, the ignition timing is further retarded as the refueling amount is larger. Accordingly, in the case where a decrease of the octane number is considered to be large, the ignition timing may be retarded to a greater extent. Thus, knocking can be made less likely to occur.

A control apparatus for an internal combustion engine according to another aspect of the present invention is a control apparatus for an internal combustion engine provided with a first fuel injection mechanism for injecting fuel into a cylinder and a second fuel injection mechanism for injecting fuel into an intake passage. The control apparatus includes a sender gauge for detecting information concerning refueling of a fuel tank, and an operation unit. The operation unit controls a ratio between an injection amount from the first fuel injection mechanism and an injection amount from the second fuel injection mechanism, according to the information concerning refueling of the fuel tank.

With the above-described configuration, the ratio between the amount of fuel injected into the cylinder and the amount of fuel injected into the intake passage is controlled according to the information about refueling of the fuel tank. For example, as the refueling amount is larger, the ratio of the amount of fuel injected into the cylinder is made higher. The temperature of the inside of the cylinder can thus be reduced. Therefore, even if the octane number is suddenly decreased when refueling with the alcohol fuel is done, knocking can be made less likely to occur. Accordingly, the frequency of occurrence of knocking can be reduced.

Preferably, the information concerning refueling is a refueling amount. The operation unit controls the ratio between the injection amount from the first fuel injection means and the injection amount from the second fuel injection means, according to the refueling amount.

With the above-described configuration, the ratio between the amount of fuel injected into the cylinder and the amount of fuel injected into the intake passage is controlled according to the refueling amount. Thus, according to a change of the octane number of the alcohol fuel, the ratio between the amount of fuel injected into the cylinder and the amount of fuel injected into the intake passage can be controlled.

More preferably, the operation unit controls the ratio such that the ratio of the injection amount from the first fuel injection mechanism is higher as the refueling amount is larger.

With the above-described configuration, the ratio of the amount of fuel injected into the cylinder is made higher as the refueling amount is larger. Thus, in the case where a decrease of the octane number is considered to be large, the temperature of the inside of the cylinder can be reduced to a large extent. Accordingly, knocking can be made less likely to occur.

More preferably, the first fuel injection mechanism is an in-cylinder injector. The second fuel injection mechanism is an intake passage injector.

With the above-described configuration, the frequency of occurrence of knocking can be reduced for an internal combustion engine where an in-cylinder injector that is a first fuel injection mechanism and an intake passage injector that is a second fuel injection mechanism are separately provided for injecting fuel.

BEST MODES FOR CARRYING OUT THE INVENTION

Embodiments of the present invention will be hereinafter described with reference to the drawings. In the following description, like components are denoted by like reference characters. These components are named identically and function identically. Therefore, a detailed description thereof will not be repeated.

Figure 1:
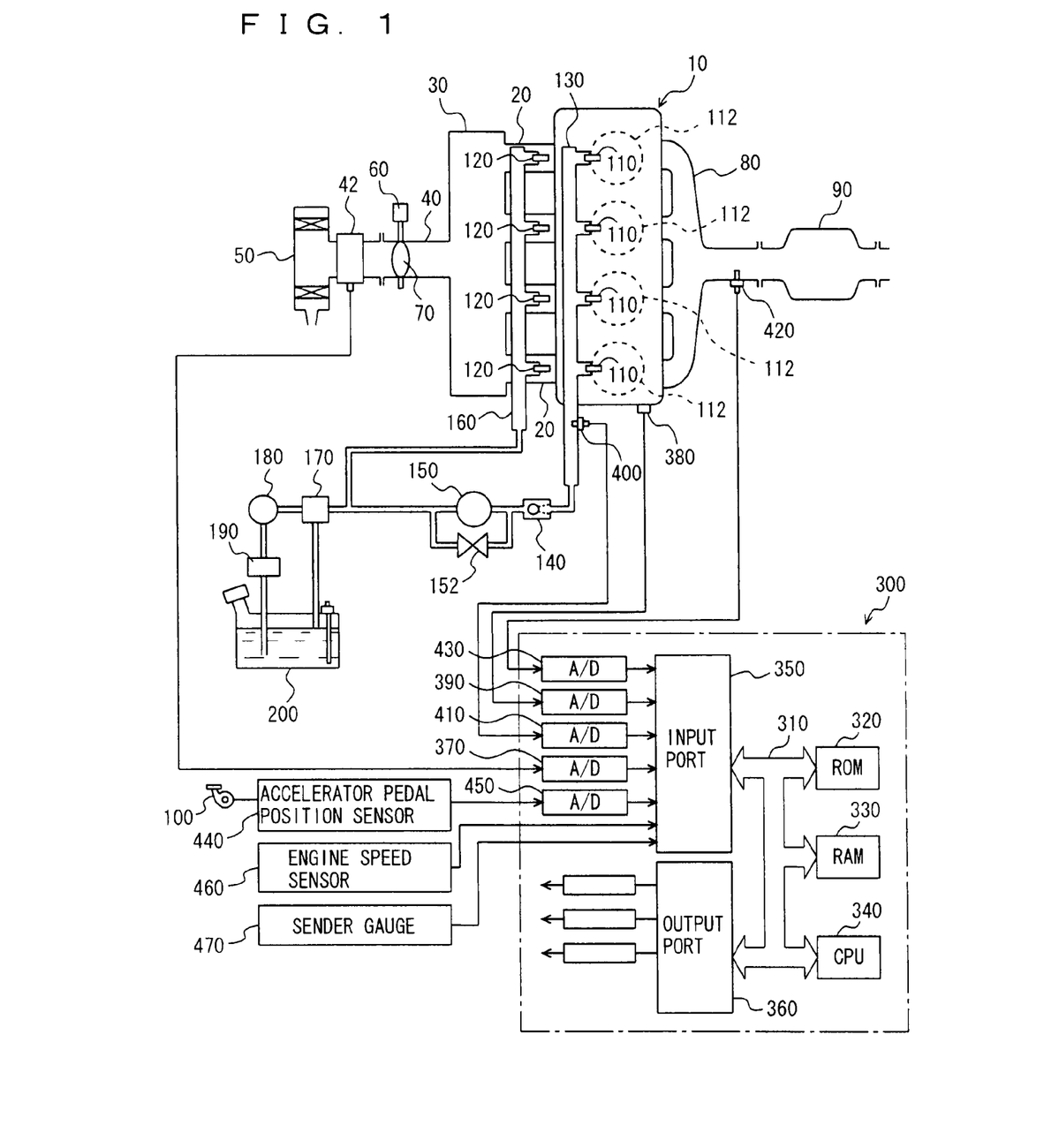
FIG. 1 is a schematic configuration diagram of an engine system.

FIG. 1 shows a schematic configuration diagram of an engine system controlled by an engine ECU (Electronic Control Unit) that is a control apparatus for an internal combustion engine according to an embodiment of the present invention. While FIG. 1 shows an in-line four-cylinder gasoline engine as an engine, the present invention is not limited to such an engine, and is applicable to various types of engines such as V-six engine and V-eight engine.

Engine 10 is an internal combustion engine driven by an alcohol fuel containing alcohol (ethanol). As shown in FIG. 1, engine 10 includes four cylinders 112 and each cylinder 112 is connected via a corresponding passage of an intake manifold 20 to a common surge tank 30. Surge tank 30 is connected via an intake duct 40 to an air cleaner 50. In intake duct 40, an airflow meter 42 and a throttle valve 70 that is driven by an electric motor 60 are disposed. The opening position of throttle valve 70 is controlled independently of an accelerator pedal 100, based on an output signal of an engine ECU 300. Each cylinder 112 is coupled to a common exhaust manifold 80, and exhaust manifold 80 is coupled to a three-way catalyst converter 90.

For each cylinder 112, an in-cylinder injector 110 for injecting fuel into the cylinder, and an intake passage injector 120 for injecting fuel into an intake port or/and the intake passage are provided. These injectors 110, 120 are each controlled based on an output signal of engine ECU 300. Further, each in-cylinder injector 110 is connected to a common fuel delivery pipe 130, and fuel delivery pipe 130 is connected to an engine-driven high-pressure fuel pump 150 via a check valve 140 allowing a flow toward fuel delivery pipe 130. While the present embodiment is described in connection with an internal combustion engine having separately-provided two types of injectors, the present invention is not limited to such an internal combustion engine. For example, the internal combustion engine may have one injector having both of the cylinder-injection capability the intake-passage-injection capability.

As shown in FIG. 1, the discharge side of high-pressure fuel pump 150 is coupled via an electromagnetic spill valve 152 to the intake side of high-pressure fuel pump 150. As the degree of opening of electromagnetic spill valve 152 is smaller, the amount of fuel supplied from high-pressure fuel pump 150 into fuel delivery pipe 130 is made larger. When electromagnetic spill valve 152 is fully opened, supply of the fuel from high-pressure fuel pump 150 to fuel delivery pipe 130 is stopped. Electromagnetic spill valve 152 is controlled based on an output signal of engine ECU 300.

Each intake passage injector 120 is connected to a common low-pressure-side fuel delivery pipe 160, and fuel delivery pipe 160 and high-pressure fuel pump 150 are connected via a common fuel pressure regulator 170 to an electric-motor-driven low-pressure fuel pump 180. Further, low-pressure fuel pump 180 is connected via a fuel filter 190 to a fuel tank 200. Fuel pressure regulator 170 is configured to return a part of the fuel discharged from low-pressure fuel pump 180 to fuel tank 200 when the pressure of the fuel discharged from low-pressure fuel pump 180 is higher than a predetermined set fuel pressure. In this way, the pressure of fuel supplied to intake passage injector 120 and the pressure of fuel supplied to high-pressure fuel pump 150 are prevented from becoming higher than the above-described set fuel pressure.

A lubrication system for engine 10 is configured to include an oil pan formed as a part of the crankcase and a lubricating oil feeding device. The lubricating oil feeding device includes components such as an oil pump, a filter, and an oil jet mechanism. A lubricating oil in the oil pan is drawn via the filter by the oil pump to be supplied to the oil jet mechanism. For lubrication between the piston and the inner peripheral surface of the cylinder (bore), the lubricating oil supplied to the oil jet mechanism is fed from the mechanism to the inner peripheral surface of the cylinder. After this, as the piston reciprocates, the lubricating oil is caused to drop downward from the inner peripheral surface of the cylinder and finally returned to the oil pan. The dropped lubricating oil is mixed with the lubricating oil in the oil pan to be supplied again for lubrication of engine 10. The lubricating oil supplied to the inner peripheral surface of the cylinder for lubrication of the piston has its temperature increased by the combustion heat of engine 10 and is thereafter returned to the oil pan.

Engine ECU 300 is configured using a digital computer, and includes a ROM (Read Only Memory) 320, a RAM (Random Access Memory) 330, a CPU (Central Processing Unit) 340, an input port 350, and an output port 360 connected to each other via a two-way bus 310.

Airflow meter 42 generates an output voltage proportional to the amount of intake air, and the output voltage of airflow meter 42 is input via an A/D converter 370 to input port 350. To engine 10, a coolant temperature sensor 380 generating an output voltage proportional to the engine coolant temperature is attached, and the output voltage of coolant temperature sensor 380 is input via an A/D converter 390 to input port 350.

To fuel delivery pipe 130, a fuel pressure sensor 400 generating an output voltage proportional to the fuel pressure in fuel delivery pipe 130 is attached, and the output voltage of fuel pressure sensor 400 is input via an A/D converter 410 to input port 350. To exhaust manifold 80 located upstream of three-way catalyst converter 90, an air-fuel ratio sensor 420 generating an output voltage proportional to the oxygen concentration in an exhaust gas is attached, and the output voltage of air-fuel ratio sensor 420 is input via an A/D converter 430 to input port 350.

Air-fuel ratio sensor 420 of the engine system in the present embodiment is a full-range air-fuel ratio sensor (linear air-fuel ratio sensor) generating an output voltage proportional to an air-fuel ratio of an air-fuel mixture burned in engine 10. As air-fuel ratio sensor 420, an $O_2$ sensor may be used which detects, in an on/off manner, whether the air-fuel ratio of the air-fuel mixture burned in engine 10 is rich or lean with respect to the stoichiometric air-fuel ratio.

In the present embodiment, engine ECU 300 calculates a feedback correction amount for the total fuel injection amount, based on an output voltage of air-fuel ratio sensor 420. In the case where a predetermined learning condition is satisfied, a learned value (a value representing a permanent deviation of the fuel injection amount) for the feedback correction amount is calculated.

In the present embodiment, the feedback correction amount is calculated to be larger for a lean air-fuel ratio (leaner than the stoichiometric air-fuel ratio). The feedback correction amount is calculated to be smaller for a rich air-fuel ratio (richer than the stoichiometric air-fuel ratio). The feedback correction amount may be calculated in a manner according to a known common technique, and thus a further detailed description thereof will not be given here.

The learned value is calculated, in a case where a predetermined learning condition is satisfied, by adding or subtracting an update amount determined based on a map, to or from a previously calculated learned value. The predetermined learning condition refers to the condition for example that the average of the feedback correction amount (average: central value for control) is smaller than a threshold (1) or larger than a threshold (2) (threshold (2)>threshold (1)).

For an excessively larger fuel injection amount (as an actual fuel injection amount is larger than a target fuel injection amount), the learned value is calculated to be smaller. In contrast, for an insufficient fuel injection amount (as an actual fuel injection amount is smaller than a target fuel injection amount), the learned value is calculated to be larger. The learned value may be calculated in a manner according to a known common technique, and thus a further detailed description thereof will not be given here.

The fuel injection amount is corrected based on the feedback correction amount and the learned value. Specifically, as the feedback amount and the learned value are larger, the fuel injection amount is corrected to be larger. As the feedback amount and the learned value are smaller, the fuel injection amount is corrected to be smaller. In the present embodiment, the correction amount for the fuel injection amount is calculated as the sum of the feedback correction amount and the learned value.

In the present embodiment, the concentration of alcohol in the fuel is detected (calculated) based on the learned value for the feedback correction amount. For example, the alcohol concentration is detected according to a map using the learned value and the temperature of the engine coolant as parameters. The method for detecting the alcohol concentration is not limited to the above-described one.

Accelerator pedal 100 is connected to an accelerator pedal position sensor 440 that generates an output voltage proportional to the extent to which accelerator pedal 100 is depressed. The output voltage of accelerator pedal position sensor 440 is input via an A/D converter 450 to input port 350. An engine speed sensor 460 generating an output pulse representing the engine speed is also connected to input port 350. ROM 320 of engine ECU 300 stores in advance, in the form of a map, values of the fuel injection amount that are set in association with operating states (such as the amount of intake air) based on the engine load factor and the engine speed obtained by the above-described accelerator pedal position sensor 440 and engine speed sensor 460, respectively, as well as correction values based on the engine coolant temperature, for example.

Further, to input port 350, a sender gauge (fuel gauge) 470 generating a signal indicating a remaining amount of the alcohol fuel in fuel tank 200 is connected. Instead of the direct input of the output signal from sender gauge 470 to input port 350, the signal from sender gauge 470 may be input via an ECU different from engine ECU 300.

Figure 2:
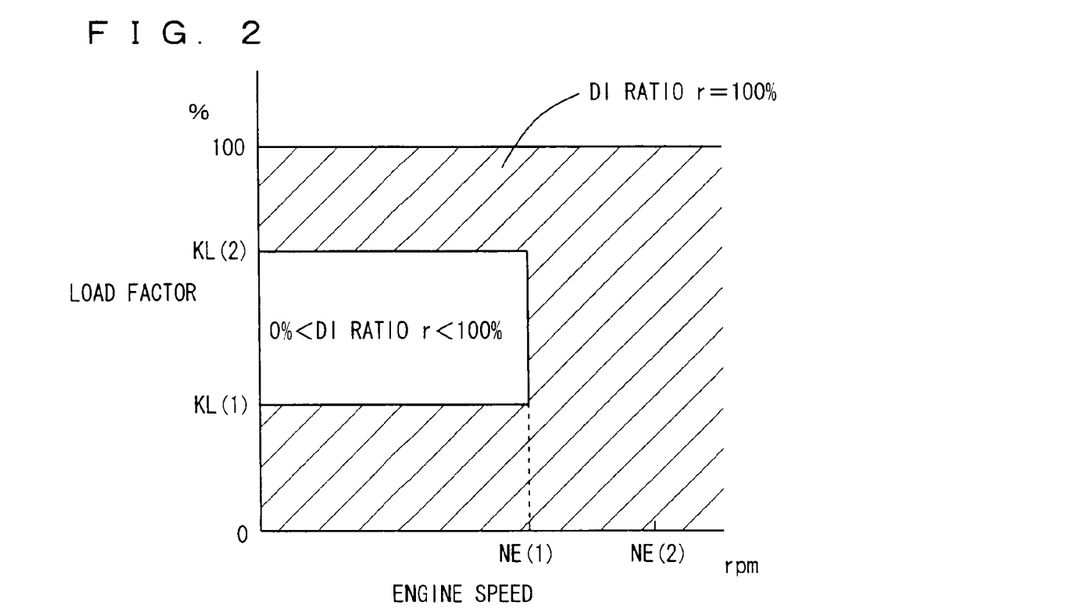
FIG. 2 is a diagram showing a DI ratio map for a warm state that is stored in an engine ECU.
Figure 3:
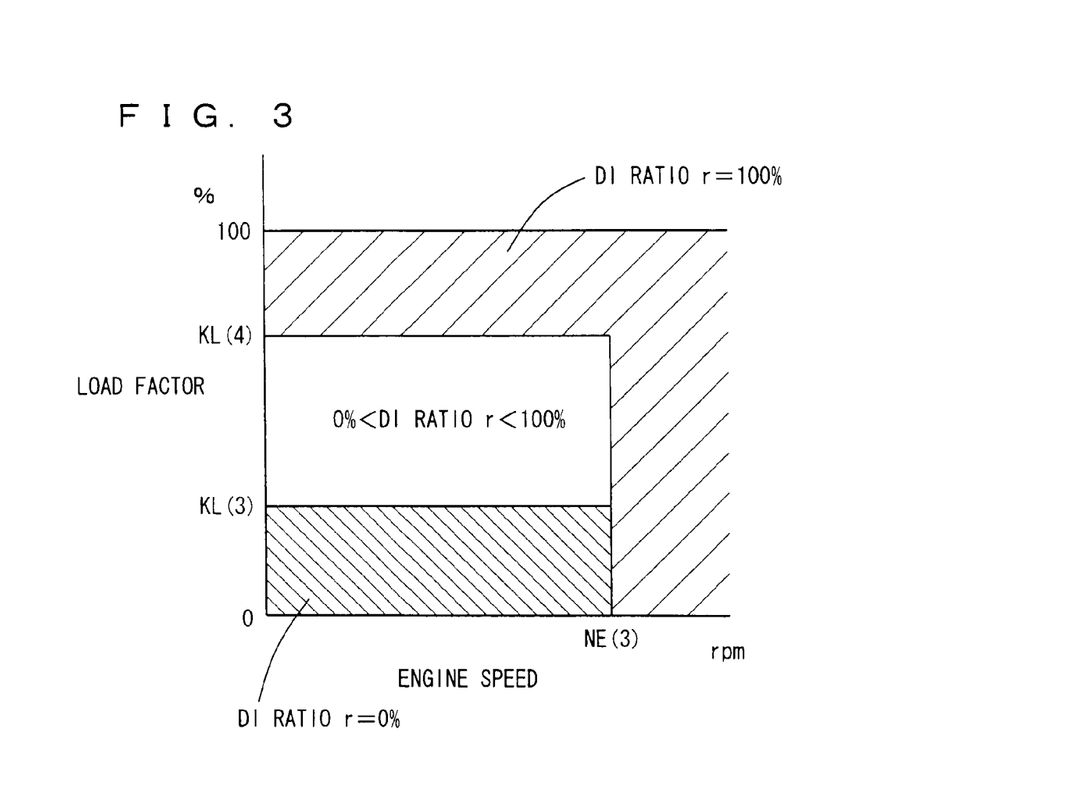
FIG. 3 is a diagram showing a DI ratio map for a cold state that is stored in the engine ECU.

Referring to FIGS. 2 and 3, maps will be described that show the fuel injection ratio (hereinafter also referred to as "DI ratio r"), namely the ratio of fuel injection between in-cylinder injector 110 and intake passage injector 120. The fuel injection ratio is information associated with the operating state of engine 10. These maps are stored in ROM 320 of engine ECU 300. FIG. 2 shows a map for a warm state of engine 10, and FIG. 3 shows a map for a cold state of engine 10.

As shown in FIGS. 2 and 3, these maps each have the horizontal axis representing the speed of engine 10 and the vertical axis representing the load factor, and show the fuel injection ratio of in-cylinder injector 110 as DI ratio r expressed in percentage.

As shown in FIGS. 2 and 3, DI ratio r is set for each operating region determined by the speed and the load factor of engine 10. "DI ratio r=100%" refers to a region where fuel is injected from in-cylinder injector 110 only, and "DI ratio r=0%" refers to a region where fuel is injected from intake passage injector 120 only. "DI ratio r≠0%," "DI ratio r≠100%" and "0%<DI ratio r<100%" refer to a region where fuel is injected by both of in-cylinder injector 110 and intake passage injector 120. Generally, in-cylinder injector 110 contributes to enhancement of the output performance while intake passage injector 120 contributes to homogeneousness of the air-fuel mixture. These injectors of two different types different in characteristics from each other are used separately or together depending on the speed and the load factor of engine 10, so that only the homogeneous combustion is performed in the case where engine 10 is in a normal operating state (a catalyst-warm-up state while at idle is considered as an example of the non-normal operating state other than the normal operating state, for example).

Further, as shown in FIGS. 2 and 3, DI ratio r between in-cylinder injector 110 and intake passage injector 120 is defined separately for the warm state map and the cold state map. The maps that are set to have different control regions for in-cylinder injector 110 and intake passage injector 120 according to different temperatures of engine 10 are used to detect the temperature of engine 10. When the temperature of engine 10 is equal to or higher than a predetermined temperature threshold, the warm state map in FIG. 2 is selected, and otherwise the cold state map shown in FIG. 3 is selected. Based on each selected map, in-cylinder injector 110 and/or intake passage injector 120 are controlled according to the speed and the load factor of engine 10.

In the present embodiment, the fuel injection amount from in-cylinder injector 110 and the fuel injection amount from intake passage injector 120 are determined based on DI ratio r, so that the total fuel injection amount is equal to a desired fuel injection amount.

A description will be given of the speed and the load factor of engine 10 set in FIGS. 2 and 3. In FIG. 2, NE (1) is set to 2500 to 2700 rpm, KL (1) is set to 30 to 50% and KL (2) is set to 60 to 90%. In FIG. 3, NE (3) is set to 2900 to 3100 rpm. Namely, there is a relation NE (1)<NE (3). NE (2) in FIG. 2 and KL (3) and KL (4) in FIG. 3 are also set appropriately.

From a comparison between FIGS. 2 and 3, it is seen that NE (3) in the cold state map shown in FIG. 3 is higher than NE (1) in the warm state map shown in FIG. 2. This means that the control region for intake-passage injector 120 is expanded toward a higher engine speed region as the temperature of engine 10 is lower. Specifically, while engine 10 is cold, deposits are unlikely to accumulate in the injection opening of in-cylinder injector 110 (even if fuel is not injected from in-cylinder injector 110). Therefore, the region where fuel is injected using intake passage injector 120 is expanded so that the homogeneousness can be improved.

From a comparison between FIGS. 2 and 3, it is seen that "DI ratio r=100%" is applied in the region where the speed of engine 10 is NE (1) or higher in the warm state map, and the region where the speed of engine 10 is NE (3) or higher in the cold state map. As for the load factor, "DI ratio r=100%" is applied in the region where the load factor is KL (2) or larger in the warm state map, and the region where the load factor is KL (4) or larger in the cold state map. This means that in-cylinder injector 110 is used alone in a predetermined high engine speed region, and that in-cylinder injector 110 is used alone in a predetermined high engine load region. Namely, in the high speed region and the high load region, the speed and the load of engine 10 are high and a relatively large amount of intake air is supplied, and thus the air-fuel mixture is readily made homogeneous even if fuel is injected by means of in-cylinder injector 110 only. Accordingly, the fuel injected from in-cylinder injector 110 is vaporized in the combustion chamber, accompanied by latent heat of vaporization (absorbing heat from the combustion chamber). Thus, the temperature of the air-fuel mixture is decreased at the compression end, so that antiknock performance is improved. Further, since the temperature of the combustion chamber is decreased, intake efficiency is improved and a high output power can be expected.

According to the warm state map shown in FIG. 2, only in-cylinder injector 110 is used when the load factor is KL (1) or less. This means that in-cylinder injector 110 is used alone in a predetermined low load region when the temperature of engine 10 is high. In the warm state where engine 10 is warm, deposits are likely to accumulate in the injection opening of in-cylinder injector 110. However, the temperature of the injection opening can be lowered by injecting fuel with in-cylinder injector 110, thus deposits are prevented from accumulating. Furthermore, a minimum fuel injection amount from in-cylinder injector 110 is ensured to prevent in-cylinder injector 110 from being clogged. Therefore, in the above-referenced region, only in-cylinder injector 110 is used.

As seen from a comparison between FIGS. 2 and 3, only the cold state map in FIG. 3 includes a region of "DI ratio r=0%." This means that only intake passage injector 120 is used in a predetermined low load region (KL (3) or less) when the temperature of engine 10 is low. In the region, engine 10 is cold, the load of engine 10 is low and the intake air amount is small, and thus the fuel is less likely to be atomized. In such a region, it is difficult to ensure favorable combustion with the fuel injection from in-cylinder injector 110. Further, particularly in the low-load and low-speed region, high output power generated using in-cylinder injector 110 is unnecessary. Accordingly, intake passage injector 120 is used alone, without using in-cylinder injector 110.

Further, in an operating state other than the normal operating state, or when the catalyst is warmed up while engine 10 is at idle (non-normal operating state), in-cylinder injector 110 is controlled in such a manner that stratified charge combustion is performed. By causing the stratified charge combustion during the catalyst warm-up operation, warming up of the catalyst is promoted and exhaust emission is improved.

Figure 4:
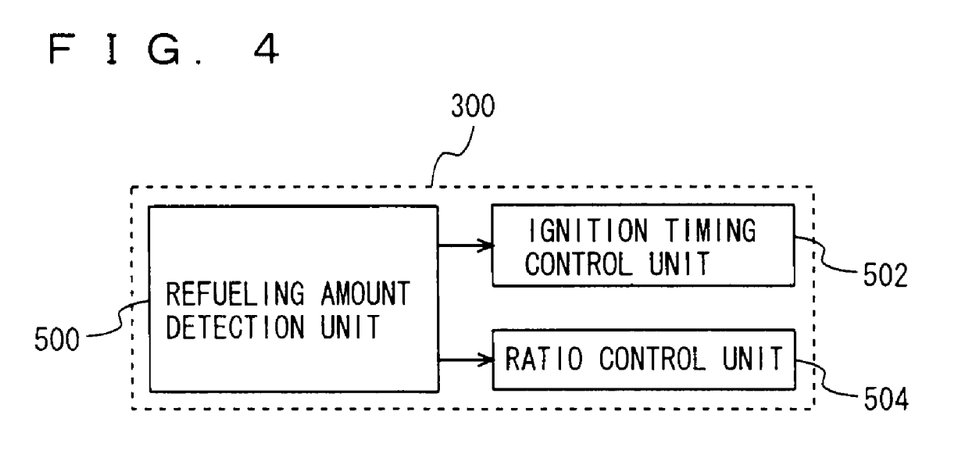
FIG. 4 is a functional block diagram of the engine ECU.

Referring to FIG. 4, functions of engine ECU 300 that is a control apparatus according to the present embodiment will be described. The functions described below may be implemented by means of hardware or implemented by means of software.

Engine ECU 300 includes a refueling amount detection unit 500, an ignition timing control unit 502 and a ratio control unit 504. Refueling amount detection unit 500 detects a refueling amount of the alcohol fuel, namely an amount of increase of the alcohol fuel, based on a signal transmitted from sender gauge 470.

Ignition timing control unit 502 controls the ignition timing according to the refueling amount of the alcohol fuel. In the present embodiment, the ignition timing is controlled in such a manner that the ignition timing is further retarded as the refueling amount of the alcohol fuel is larger. The method for controlling the ignition timing is not limited to the above-described one.

Ratio control unit 504 controls DI ratio r according to the refueling amount of the alcohol fuel. In the present embodiment, DI ratio r is controlled in such a manner that DI ratio r is higher as the refueling amount of the alcohol fuel is larger. Specifically, DI ratio r is corrected in such a manner that the ratio of the fuel injection amount from in-cylinder injector 110 is higher as the refueling amount of the alcohol fuel is larger. The method for controlling DI ratio r is not limited to the above-described one.

Figure 5:
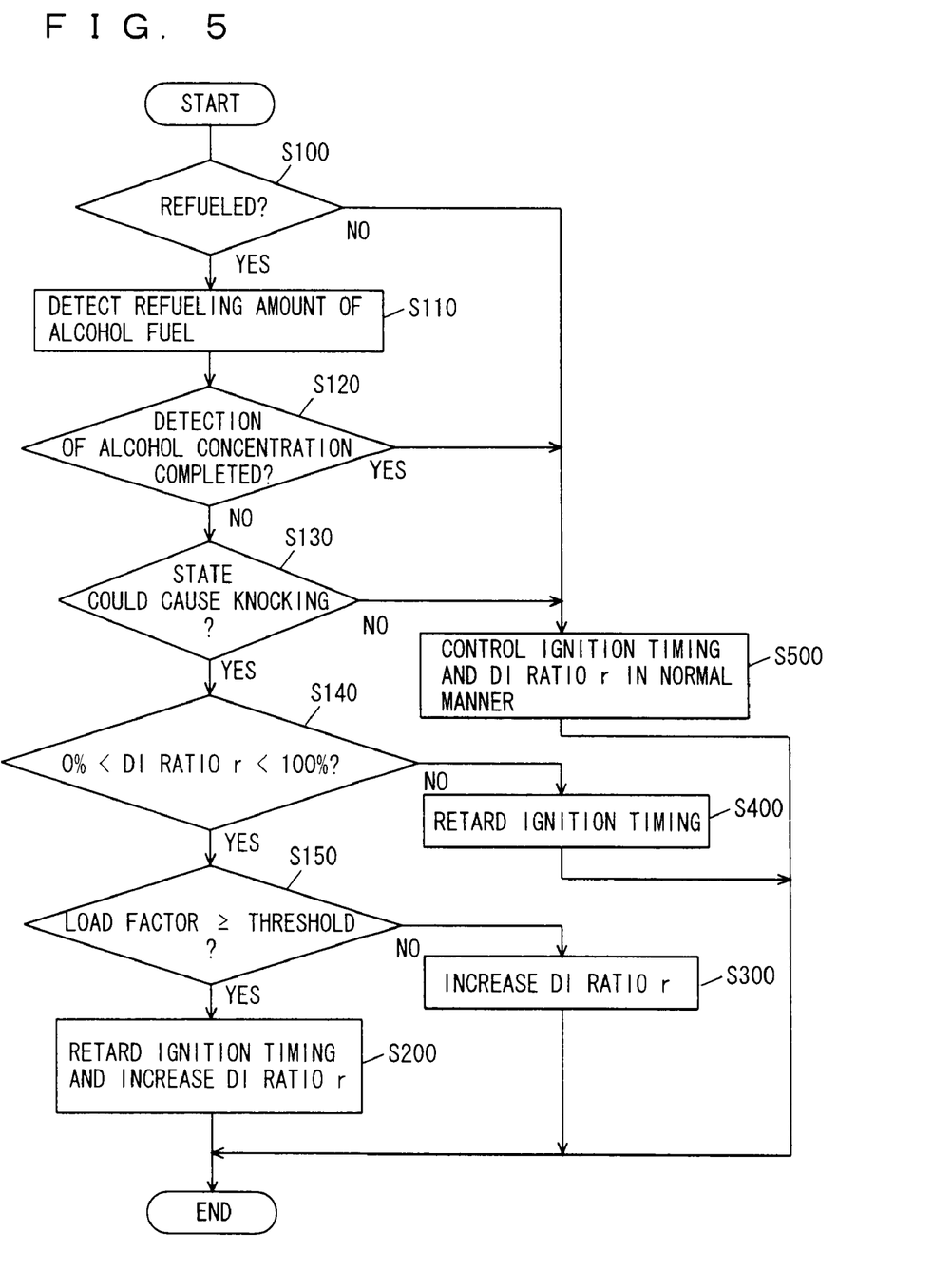
FIG. 5 is a flowchart showing a control structure of a program executed by the engine ECU.

Referring to FIG. 5, a control structure of a program executed by engine ECU 300 that is a control apparatus according to the present embodiment will be described. The program described below is recorded for example in ROM 320. The program executed by engine ECU 300 may be distributed through the market in the form recorded on a recording medium such as CD (Compact Disc) or DVD (Digital Versatile Disc).

In step (hereinafter "step" is abbreviated as "S") 100, engine ECU 300 determines whether or not refueling with the alcohol fuel is performed, namely whether or not the alcohol fuel in fuel tank 200 is increased, based on a signal transmitted from sender gauge 470. When refueling with the alcohol fuel is performed (YES in S100), the process proceeds to S110. Otherwise (NO in S100), the process proceeds to S500.

In S110, engine ECU 300 detects the refueling amount (amount of increase) of the alcohol fuel, based on a signal transmitted from sender gauge 470.

In S120, engine ECU 300 determines whether or not detection of the alcohol concentration is completed. For example, in the case where the amount of change of the alcohol concentration that is detected using a learned value for a feedback correction amount is continuously smaller than a threshold for a predetermined time or more, it is determined that detection of the alcohol concentration is completed. The method for determining whether or not detection of the alcohol concentration is completed is not limited to the above-described one. When detection of the alcohol concentration is completed (YES in S120), the process proceeds to S500. Otherwise (NO in S120), the process proceeds to S130.

In S130, engine ECU 300 determines whether or not the operating state of engine 10 is a state that could cause knocking. For example, in the case where the engine speed and the load factor each have a value within a knocking region that is determined as a region that could cause knocking, it is determined that the operating state of engine 10 is a state that could cause knocking. The method for determining whether or not the operating state is a state that could cause knocking is not limited to the above-described one. When the operating state of engine 10 is a state that could cause knocking (YES in S130), the process proceeds to S140. Otherwise (NO in S130), the process proceeds to S500.

In S140, engine ECU 300 determines whether or not DI ratio r defined according to the map shown in FIG. 2 or 3 as described above is larger than 0% and smaller than 100%. When DI ratio r is larger than 0% and smaller than 100% (YES in S140), the process proceeds to S150. Otherwise (NO in S140), the process proceeds to S400.

In S150, engine ECU 300 determines whether or not the load factor of engine 10 is equal to or larger than a threshold. When the load factor of engine 10 is equal to or larger than the threshold (YES in S150), the process proceeds to S200. Otherwise (NO in S150), the process proceeds to S300.

In S200, engine ECU 300 retards the ignition timing according to the refueling amount of the alcohol fuel, and increases DI ratio r according to the refueling amount of the alcohol fuel.

In S300, engine ECU 300 increases DI ratio r according to the refueling amount of the alcohol fuel.

In S400, engine ECU 300 retards the ignition timing according to the refueling amount of the alcohol fuel.

In S500, engine ECU 300 controls the ignition timing and DI ratio r in a normal manner. Specifically, engine ECU 300 controls the ignition timing and controls DI ratio r without using the refueling amount of the alcohol fuel.

A description will be given of an operation of engine ECU 300 that is a control apparatus according to the present embodiment, based on the above-described structure and flowchart.

When refueling with the alcohol fuel is performed (YES in S100), the refueling amount of the alcohol fuel is detected (S110). When refueling with the alcohol fuel is done, the octane number could be changed according to the refueling amount of the alcohol fuel, due to a difference between the alcohol concentration of the alcohol fuel remaining in fuel tank 200 and the alcohol concentration of the alcohol fuel supplied for refueling. If the octane number is suddenly decreased, the frequency of occurrence of knocking could increase.

In the case where detection of the alcohol concentration is completed, knocking can be suppressed by setting the ignition timing to any timing appropriate for the alcohol concentration. However, some time is required to complete detection of the alcohol concentration. After refueling with the alcohol fuel, therefore, there could be some period of time in which the ignition timing cannot be set to any timing appropriate for the actual alcohol concentration.

Accordingly, when detection of the alcohol concentration is not completed (NO in S120), it is determined whether or not the operating state of engine 10 is a state that could cause knocking (S130). When the operating state of engine 10 is a state that could cause knocking (YES in S130), it is determined whether or not DI ratio r determined according the map shown in FIG. 2 or 3 as described above is larger than 0% and smaller than 100% (S140).

When DI ratio r is larger than 0% and smaller than 100% (YES in S140), it is determined whether or not the load factor of engine 10 is equal to or larger than a threshold (S150). When the load factor of engine 10 is equal to or larger than the threshold (YES in S150), the engine state is considered as being highly likely to cause knocking.

In this case, the ignition timing is retarded according to the refueling amount of the alcohol fuel, and DI ratio r is increased according to the refueling amount of the alcohol fuel (S200). Thus, the combustion temperature of the air-fuel mixture, namely the mixture of the alcohol fuel and the air can be decreased and the inside of the cylinder can be cooled by the alcohol fuel directly injected into the cylinder. In this way, knocking can be made less likely to occur.

When the load factor of engine 10 is smaller than the threshold (NO in S150), knocking can be made less likely to occur without retarding the ignition timing. In this case, DI ratio r is increased according to the refueling amount of the alcohol fuel (S300). Thus, the inside of the cylinder can be cooled by the alcohol fuel directly injected into the cylinder. In this way, knocking can be made less likely to occur.

When DI ratio r is 0% or 100% (NO in S140), DI ratio r cannot be increased. Therefore, the ignition timing is retarded according to the refueling amount of the alcohol fuel (S400). Thus, the combustion temperature of the air-fuel mixture, namely the mixture of the alcohol fuel and the air can be decreased. In this way, knocking can be made less likely to occur.

When the operating state of engine 10 is not a state that could cause knocking (NO in S130), it is unnecessary to make knocking less likely to occur. Further, when detection of the alcohol concentration is completed (YES in S120), the ignition timing appropriate for the alcohol concentration can be set to suppress knocking. In these cases, the ignition timing and DI ratio r are controlled in a normal manner without using the refueling amount of the alcohol fuel (S500).

As seen from above, the engine ECU that is a control apparatus according to the present embodiment is used to retard the ignition timing or increase DI ratio r according to the refueling amount of the alcohol fuel. Accordingly, the combustion temperature of the mixture of the alcohol fuel and the air can be decreased and the inside of the cylinder can be cooled by means of the alcohol fuel directly injected into the cylinder. In this way, knocking can be made less likely to occur.

Instead of retarding the ignition timing or increasing DI ratio r according to the refueling amount of the alcohol fuel, the ignition timing may be retarded or DI ratio r may be increased according to any value having a correlation with the refueling amount of the alcohol fuel, such as the distance over which the vehicle travels from the time of the preceding refueling with the alcohol fuel to the time of the latest refueling with the alcohol fuel.

Further, the ignition timing may be retarded or DI ratio r may be increased according to the remaining amount of the alcohol fuel before refueling. Alternatively, the ignition timing may be retarded or DI ratio r may be increased according to any value having a correlation with an amount of change of the octane number, such as the ratio between the remaining amount of the alcohol fuel before refueling and the refueling amount of the alcohol fuel. In this case, the ignition timing may be further retarded or DI ratio r may be further increased as the refueling amount of the alcohol fuel is larger relative to the remaining amount of the alcohol fuel before refueling.

Specifically, in the case where the remaining amount of the alcohol fuel before refueling is small, the ignition timing may be retarded or DI ratio r may be increased even if the refueling amount of the alcohol fuel is small.

Moreover, the ignition timing may be retarded or DI ratio r may be increased when it is assumed that refueling with the alcohol fuel is completed, such as the time after the fuel lid is opened.

It should be construed that embodiments disclosed herein are by way of illustration in all respects, not by way of limitation. It is intended that the scope of the present invention is defined by claims, not by the description above, and includes all modifications and variations equivalent in meaning and scope to the claims.

The invention claimed is:

1. A control apparatus for an internal combustion engine provided with an in-cylinder injector for injecting fuel into a cylinder and an intake passage injector for injecting fuel into an intake passage, and using an alcohol fuel, said control apparatus comprising:
   a sender gauge for detecting information concerning refueling of a fuel tank; and
   an operation unit, wherein
   said operation unit controls a ratio between an injection amount from said in-cylinder injector and an injection amount from said intake passage injector, according to a refueling amount of said fuel tank.

2. The control apparatus for an internal combustion engine according to claim 1, wherein
   said operation unit controls the ratio such that the ratio of the injection amount from said in-cylinder injector is higher as the refueling amount is larger.

3. The control apparatus for an internal combustion engine according to claim , wherein
   said operation unit controls ignition timing such that the ignition timing is further retarded as the refueling amount is larger.

4. A control method for an internal combustion engine provided with an in-cylinder injector for injecting fuel into a cylinder and an intake passage injector for injecting fuel into an intake passage, and using an alcohol fuel, said control method comprising the steps of:
   detecting information concerning refueling of a fuel tank; and
   controlling a ratio between an injection amount from said in-cylinder injector and an injection amount from said intake passage injector, according to a refueling amount of said fuel tank.

5. The control method for an internal combustion engine according to claim 4, wherein
   said step of controlling a ratio between an injection amount from said in-cylinder injector and an injection amount from said intake passage injector includes the step of controlling the ratio such that the ratio of the injection amount from said in-cylinder injector is higher as the refueling amount is larger.

6. The control method for an internal combustion engine according to claim 4, further comprising the step of controlling ignition timing such that the ignition timing is further retarded as the refueling amount is larger.

7. A control apparatus for an internal combustion engine provided with an in-cylinder injector for injecting fuel into a cylinder and an intake passage injector for injecting fuel into an intake passage, and using an alcohol fuel, said control apparatus comprising:
   means for detecting information concerning refueling of a fuel tank; and
   control means for controlling a ratio between an injection amount from said in-cylinder injector and an injection amount from said intake passage injector, according to a refueling amount of said fuel tank.

8. The control apparatus for an internal combustion engine according to claim 7, wherein
   said control means includes means for controlling the ratio such that the ratio of the injection amount from said in-cylinder injector is higher as the refueling amount is larger.

9. The control apparatus for an internal combustion engine according to claim 7, further comprising means for controlling ignition timing such that the ignition timing is further retarded as the refueling amount is larger.

* * * * *